(12) United States Patent
Jones et al.

(10) Patent No.: US 7,829,498 B2
(45) Date of Patent: Nov. 9, 2010

(54) HARD COAT AND IMAGE RECEIVING LAYER STRUCTURES FOR IDENTIFICATION DOCUMENTS

(75) Inventors: Robert L. Jones, Andover, MA (US); Daoshen Bi, Boxborough, MA (US); Tung-Feng Yeh, Waltham, MA (US)

(73) Assignee: L-I Secure Credentialing, Inc., Billerica, MA (US)

( * ) Notice: Subject to any disclaimer, the term of this patent is extended or adjusted under 35 U.S.C. 154(b) by 1123 days.

(21) Appl. No.: 11/095,923

(22) Filed: Mar. 30, 2005

(65) Prior Publication Data

US 2005/0255280 A1   Nov. 17, 2005

Related U.S. Application Data

(60) Provisional application No. 60/558,768, filed on Mar. 31, 2004.

(51) Int. Cl.
  *B41M 5/20* (2006.01)
  *B41M 5/24* (2006.01)

(52) U.S. Cl. .................. 503/227; 428/195.1; 8/471

(58) Field of Classification Search ............... 503/227; 428/195.1; 8/471
See application file for complete search history.

(56) References Cited

U.S. PATENT DOCUMENTS

| 4,621,271 | A |   | 11/1986 | Brownstein |
| 5,024,989 | A |   | 6/1991 | Chiang et al. |
| 5,267,755 | A | * | 12/1993 | Yamauchi et al. .............. 283/86 |
| 5,432,329 | A | * | 7/1995 | Colgate et al. ............... 235/487 |
| 6,066,594 | A |   | 5/2000 | Gunn et al. |
| 6,318,633 | B1 | * | 11/2001 | Drexler ....................... 235/454 |

* cited by examiner

*Primary Examiner*—Mark Ruthkosky
*Assistant Examiner*—David J Joy
(74) *Attorney, Agent, or Firm*—Mintz Levin Cohn Ferris Glovsky and Popeo, P.C.

(57) ABSTRACT

The invention provides hard coat and image receiving layer structures and related methods used in ID document production. These structures and methods provide ID documents that offer hard protection in areas where needed (e.g., in optical windows for machine readable data), and also provide image receiving layers for later printing of variable data, such as personalization information of the bearer. Implementations of the structure provide an effective interface between hard coat and image receiving layers that provides enhanced durability in manufacture and field use.

12 Claims, 2 Drawing Sheets

HARD COAT AND IMAGE RECEIVING LAYER STRUCTURES FOR IDENTIFICATION DOCUMENTS

RELATED APPLICATION DATA

This application claims benefit of U.S. Patent Application No. 60/558,768, filed Mar. 31, 2004, which is hereby incorporated by reference.

TECHNICAL FIELD

The invention generally relates to identification and security documents, and in particular, relates to a document structure and method using protective coatings and image receiving layers that enable variable printing on the structure and optical reading of data from the structure.

BACKGROUND AND SUMMARY

Identification documents ("ID documents") play a critical role in today's society. One example of an ID document is an identification card ("ID card"). ID documents are used on a daily basis—to prove identity, to verify age, to access a secure area, to evidence driving privileges, to cash a check, and so on. Additionally, because we live in an ever-evolving cashless society, ID documents are used to make payments, access an automated teller machine (ATM), debit an account, or make a payment, etc.

For the purposes of this disclosure, ID documents are broadly defined, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc.

Many types of ID documents carry information relating to the identity of the bearer. As this information varies from one document to another, the document design needs to enable a method for printing or otherwise recording variable data on the document. Examples of variable data include personalization information like the bearer's name, address, birth date, signature, photographic image and other biometric data (e.g., a fingerprint, a facial image or template, or iris or retinal template). ID documents often include both variable data as well as fixed data (e.g., data that remains fixed across a set of cards like the issuer name, jurisdiction, lot number, etc.). In some cases, the fixed data is pre-printed on an ID document during manufacturing, while variable data is printed at the time of enrollment when the prospective bearer provides personalization information.

ID documents typically include security features, as well as machine readable features such as bar codes, a magnetic stripe or other magnetic storage media, IC chip or other electronic storage media, RFID tag, digital watermark, optical memory device, etc.

Technology for capturing bearer information and printing ID documents has evolved considerably, and there are a variety of methods in use. The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate), which has a layer for receiving the dyes transferred imagewise from the donor sheets. Thermal dye transfer methods are described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiving layer (which could, for example, be part of an ID document) by the localized application of heat or pressure, via a stylus or thermal printhead at a discrete point. When the dyes are transferred to the receiver, the dyes diffuse into the receiving layer (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiving layer, to produce a continuous tone image. D2T2 can have an increased cost as compared to other methods, however, because of the special dyes needed and the cost of D2T2 ribbons. Also, the quality of D2T2-printed image may depend at least on an ability of a mechanical printer system to accurately spatially register a printing sequence, e.g., yellow, magenta, cyan, and black. For more information about D2T2 printing for ID documents and related technology, see U.S. Pat. No. 6,066,594, which is hereby incorporated reference.

Another thermal imaging technology is thermal or mass transfer printing. With mass transfer printing, a material to be deposited on a receiving layer (such as carbon black (referred to by the symbol "K")) is provided on a mass transfer donor medium. When localized heat is applied to the mass transfer donor medium, a portion (mass) of the material is physically transferred to the receiving layer, where it sits "on top of" the receiving layer. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

In addition to these forms of printing, other forms of printing and applying variable data are used in ID documents, including ink jet printing, laser printing and laser engraving.

In many ID document applications, there is a need to integrate document structure for printing variable information, such as the bearer's personal information, as well as a host of other security features and machine readable features. The need to support different features poses a number of challenges because these features often use different materials with different attributes and related manufacturing processes. For example, some features require special materials to enable printing, recording or reading of information. These materials also have different resistances to wear and tear and may require particular processes and materials to join them together (e.g., lamination and adhesive), as well as different layers to protect them or facilitate information recording and reading functions (e.g., protective coatings, image receiving layers, transparent layers for optical reading, etc.). When not formulated correctly, the various materials can interact and result in both reduction in the manufacturing yield of the ID documents and degradations of the printed information or properties of other conflicting features on the document while in circulation due to normal wear and tear.

One particular challenge is posed by ID documents that require both variable printing of personal information as well as areas for supporting reading and writing to optical memory. Optical memory devices require clear optical paths for writing and reading to the device in the document. One type of optical memory device is the optical storage media used in optical memory cards from LaserCard Systems Corp. of Mountain View, Calif. The manufacturer creates card stock by combining webs of polycarbonate film with silver based optical storage media using an acrylate based adhesive system, cured with an electron beam process. The optical storage media occupies areas of the card stock and requires a clear optical path over a substantial portion of this area. To protect the optical path, the manufacturer applies a clear protective hard coat (e.g., acrylic hard coat) over the card stock. The manufacturer then applies a D2T2 image receiving layer over the protective hard coat to enable variable printing of personalized information. This process includes laminating strips of vinyl as the receiving layer with associated adhesive onto the protective coating of the card stock. The application of the image receiving layer in this fashion is disadvantageous because it involves a slow and tedious lamination process, and the resulting structure of receiving layer on hard coat is subject to de-lamination during manufacture and use in the field.

The invention provides hard coat and image receiving layer structures and related methods used in ID document production. These structures and methods provide ID documents that offer hard protection in areas where needed (e.g., in optical windows for optical machine readable data), and also provide image receiving layers for later printing of variable data, such as personalization information of the bearer. Implementations of the structure provide an effective interface between hard coat and image receiving layers that provides enhanced durability in manufacture and field use.

One aspect of the invention is an identification document structure. The structure comprises an image receiving layer on a document that includes an optical storage device. The image receiving layer covers first area of the document surface. The structure includes a hard coat layer on the image receiving layer. The hard coat layer covers a second area of the document structure corresponding to an optical window of the optical storage device. The hard coat layer does not cover at least a portion of the first area to enable the image receiving layer to receive variable printing after application of the hard coat layer. In one particular implementation, the hard coat layer is applied in stripes on a D2T2 image receiving layer and cured to create a durable interface between the hard coat and image receiving layers.

Another aspect of the invention is an identification document film comprising a polymer layer and an image receiving layer on the polymer layer. The image receiving layer covers a first area of the polymer layer. The film also includes a hard coat layer on the image receiving layer. The hard coat layer covers a second area of the polymer layer corresponding to an optical window for an optical storage device. The hard coat layer does not cover at least a portion of the first area to enable the image receiving layer to receive variable printing after application of the hard coat layer.

Another aspect of the invention is an identification document film comprising a polymer layer, an image receiving layer, and a hard coat layer. The hard coat layer and the image receiving layer are interleaved over the polymer layer such that the hard coat layer provides an optical window for an optical storage device, and the image receiving layer is operable to receive variable printing. In one embodiment, the film includes a primer on the polymer layer. The hard coat and image receiving layer are interleaved and applied to the primer on the polymer layer. In an alternative embodiment, the image receiving layer and the hard coat layer are interleaved and applied directly to the polymer layer.

Yet another aspect of the invention is a method of making a film for an identification document. The method provides a polymer layer with a first surface area. It then applies an image receiving layer to at least a portion of the first surface area, and applies a hard coat layer to at least a portion of the image receiving layer. The hard coat layer provides protection for an optical window of an optical storage medium. The image receiving layer is operable to receive personalized printing after the hard coat layer is applied.

Further features will become apparent with reference to the following detailed description and accompanying drawings.

DETAILED DESCRIPTION

Figure 1:
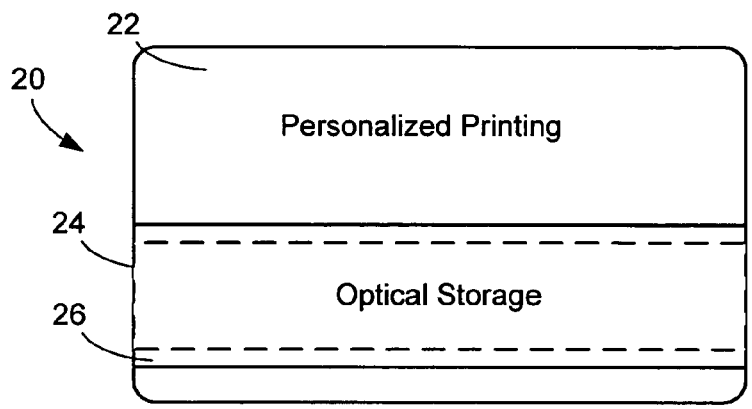
FIG. 1 is a diagram illustrating a top surface of an ID document structure 20.

FIG. 1 is a diagram illustrating a top surface of an ID document structure 20. The surface of the document includes a first area for receiving personalized printing 22, and a second area that serves as an optical window for an optical storage medium 24. The optical storage medium is shown in dashed lines to reflect that it is embedded in layers of the document structure. A strip of a protective hard coat 26 sits on top of the optical window, covering a portion of the ID document surface.

This diagram shows the protective hard coat layer in a stripe format overlapping a portion of the document surface that forms a window for the optical storage media. This format enables the hard coat layer to be placed over a sub-area of the total surface area of the document, leaving the remaining area covered by an image receiving layer exposed for variable printing. One or more stripes or other geometric arrangements of the hard coat layer may be placed over an image receiving layer (either covering the entire surface or selective areas of the document). The image receiving layer in the remaining area(s) not covered by the protective hard coat may be used for receiving variable printing variable information. In alternative implementations, the geometric arrangement of the protective coating and image receiving layers on the document surface may vary to accommodate different optical window and printing area shapes and sizes.

Figure 2A:
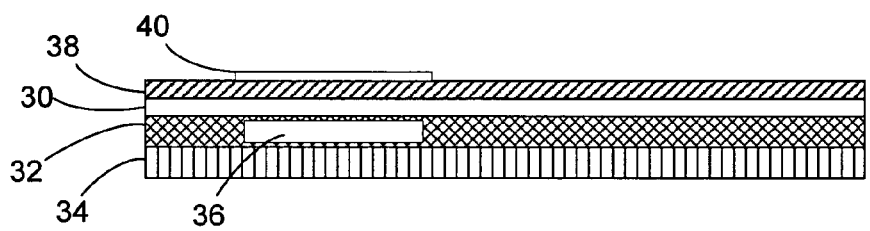
FIG. 2A is a cross sectional view of the ID document structure of FIG. 1 shown in the direction of the stripe of protective hard coating.

FIG. 2A is a cross sectional view of the ID document structure of FIG. 1 shown looking into the direction of the stripe of protective hard coating. The document structure includes layers of polymer (e.g., polyester, polycarbonate, etc.) 30, 32 and 34 and associated adhesive system used to combine the polymer layers with a strip of optical storage media 36, such as a formatted silver based optical storage medium from LaserCard Systems Corp. In one implementation, the document structure is manufactured by laminating together polymer webs and strips of optical storage media with an acrylate based adhesive, and curing with an electron beam curing process as described previously.

The document structure also includes an image receiving layer 38 on the document structure surface, and a protective hard coat layer 40, in stripe format, on the surface of the image receiving layer.

Figure 2B:
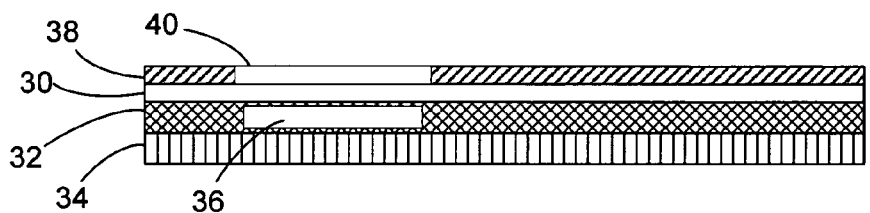
FIGS. 2B and 2C are cross sectional views of alternative ID document structures.

As shown in FIG. 2B, the hard coat layer and image receiving layer can be interleaved in strips and applied directly to the document structure 30. This approach enables the outer surface of the image receiving and hard coat layers to be roughly at the same surface height on the ID card to give the outer surface of the ID card a smooth, even feel. In this embodiment, the thickness of the interleaved hard coat and image receiving strips may be varied such that their outer surfaces are at the same or different surface heights. For example, the implementer may want to make the surface of the hard coat recessed relative to the rest of the card surface to provide further protection against abrasion, and thus, increase the chances that the optical window will remain clear despite wear and tear.

Figure 2C:
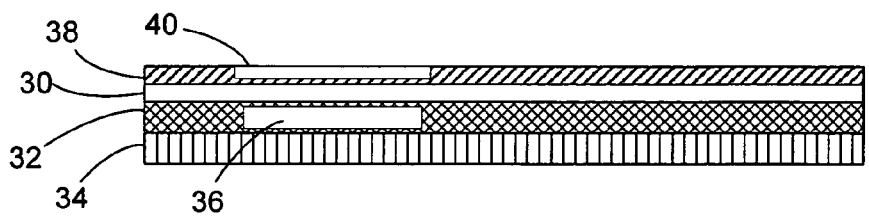

As shown in FIG. 2C, the thickness of the image receiving layer in the area over the optical memory may be reduced such that when the strip of hard coat layer 40 is placed over the optical memory area, its outer surface is substantially even with or below the outer surface of the image receiving layer.

FIGS. 2A-C illustrate a single document structure used for one ID card, but in a typical manufacturing process, the document structure is prepared in a roll having a width of several ID cards wide and hundreds of feet long. In this case, the document structure includes stripes of optical storage media for each row of ID cards and corresponding stripes of hard coat layers running in the machine direction of the roll. Individual ID cards are die cut from the manufactured roll. The image receiving layer is co-extensive with the ID card surface, but it need not be.

Figure 3:
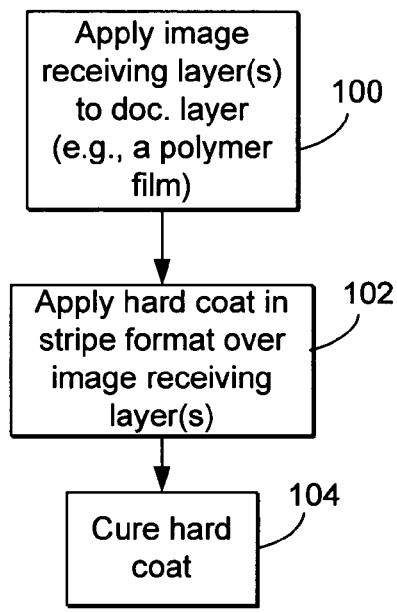
FIG. 3 is a flow diagram illustrating a process for making the document structure of FIG. 2.

FIG. 3 is a flow diagram illustrating a process for making the document structure of FIG. 2A. The input to this process is a roll of clear polymer laminate structure (e.g., 13 mil of clear polycarbonate, about 16" wide and hundreds of feet long). In step 100, the process applies an image receiving layer or layers to the clear polymer structure. One particular method applies D2T2 image receiving layers in a slot coating operation resulting in approximately an 8-12 micron coating.

In step 102, the process applies a hard coat layer in stripe format (e.g., 5 lanes of about 0.6" wide each) over the image receiving layer. There are different ways of applying the coatings described here, including slot, rod or gravure coating, etc. Slot coating is typically used to apply the hard coat in a stripe format in the machine direction. Gravure coating offers more flexibility in varying the geometric format of the hard coat (e.g., to apply hard coating selectively in different geometric structures to coincide with different shapes and sizes of optical windows and optical storage devices).

A D2T2 layer can be overall coated or coated in stripes. Preferably, the D2T2 layer is overall coated with the hard coat layer being placed in stripes, eliminating the need to register the layers and bonding the hard coat to the D2T2 layer (which is destructively bonded to the polycarbonate layer below it).

In step 104, the process cures the hard coat layer. In one implementation, for example, the process performs UV curing compatible with the hard coat material. Other forms of curing may be used, such as electron beam or heat curing. The process can be adjusted to step down the thickness of the hard coat beyond that of the image receiving layer. For example, a well or recess in the document surface can be formed over the optical memory medium by adjusting the thickness and placement of the document structure layers at the optical window relative to the thickness and placement outside the optical window. This difference in thickness and or placement forms a well such that the ID card surface outside the optical window is higher than the surface over the optical storage medium. As such, the well provides increased abrasion protection for the optical storage medium.

By applying the hard coat to the image receiving layer, it is possible to obtain non-destruct bonding between the hard coat and image receiving layer. Applying and curing the hard coat as described (e.g., applying a curable acrylate based formulation in stripes on the image receiving layer) results in improved bonding at the interface between the hard coat and image receiving layer. This approach enables the two layers to chemically bond, either by the addition of a co-solvent in the acrylate mix (thus mixing the two layers at the interface) or by adding components that bond to the polymer layer directly.

As shown in FIG. 2B, the hard coat and image receiving layers may be interleaved in strips and joined directly to the document layer below them in the document structure. In this case, the hard coat need not be placed on the image receiving layer, but instead, may be placed in gaps where the image receiving layer has not been placed.

Having described the document structure and process for making it, we now provide further implementation details about the image receiving and hard coat layers.

In one of the D2T2 image receiving layer implementations, the D2T2 image receiving layer is prepared in the form of a coating, which is applied via a slot coating process. An example composition of the D2T2 coating fluid is as follows:

Solvent: MEK, 80-90 parts;
Resin: PVC, 8~10 parts,
Silica: 0.0~3 parts
Antistatic Agent: Cyastat, 0~6 parts
Surfactants: 0.01~0.1 parts (e.g., 0.02 parts).

These portions are approximate. This D2T2 coating fluid can be overall coated onto polycarbonate film (or other polymer film such as a polyester laminate) by slot, rod, or gravure coating method. After it is dry, the final coating composition for the D2T2 coating is approximately:

PVC: 94~99.8%
Silica: 0~3%
Antistatic agent: 0~3%
Surfactant: 0.2%

We now describe examples of a UV curable hard coat formulation in more detail. Our implementations of the hard coat formulations are liquid materials made into a coating fluid. The coating fluid is coated onto D2T2 coated polycarbonate film in the machine direction by slot or gravure coating method. The coating is UV cured.

In the hard coat development process, our objective was to create a hard coat formulation that satisfied the following tests:

1. Abrasion Test: No more than a 5% increase in haze after 100 revolutions with a CS10F wheel and a 500 gram weight on a Taber Abraser.
2. Brittleness Test: No cracking after bending around a ¼" mandrel.

To test the coating formulations, we bar coated them on 15-mil polycarbonate films with a D2T2 receiving layer, and then cured the coatings at 9 feet per minute using a 300-watt per inch H bulb (about 2000 mJ/cm2) on a Fusion BL-6B UV System.

We performed the abrasion test on a 5130 Abraser from Taber Industries with CS10F wheels and a 500 gram weight. The abrasive wheels were resurfaced for 25 cycles before each test. We compared the optical transmittance change of samples before and after abrasion (100 cycles) with a control hard coat to determine the abrasion resistance of the test formulation.

We performed the brittleness test by bending a sample around a ¼" mandrel.

The following provides examples of two hard coat formulations: Hard Coat A, and Hard Coat B.

Hard Coat Formulation Based on UVHC 8558 (Hard Coat A)

Hard Coat A is based on a UV-curable silicone hard coat product named UVHC 8558 from GE Silicones. UVHC 8558 hard coat on 15-mil polycarbonate film showed a better abrasion resistance than the control hard coat. However, while some UVCH 8558 hard coat samples passed the brittleness test, others showed some micro cracks. To assure passage of the brittleness test, we modified UVCH 8558 with SR 285, tetrahydrofurfuryl acrylate, a low shrinkage monomer. Table 1 shows the formulation of modified UVHC 8558 that passed the brittleness test and had a better abrasion resistance than the control hard coat, which is shown in Table 3.

TABLE 1

Hard Coat A

| Component | Weight (%) | |
|---|---|---|
| UVHC 8558 | 77 | Hard coat fluid from GE |
| SR 285 | 23 | tetrahydrofurfuryl acrylate monoer from Sartomer |

Hard Coat B

Hard Coat A satisfied the test requirements, but at a higher cost. We developed a lower cost formulation, referred to as Hard Coat B. CN 980, a urethane acrylate from Sartomer, offers fast cure and superior physical properties such as abrasion resistance and flexibility, but has high viscosity. After studying the effect of different mono-, di- and tri-functional monomers as diluents with CN 980, we developed a 100% solid hard coat formulation (Table 2) that passed the brittleness tests and had a similar (or little better) abrasion resistance than the control (Table 3).

TABLE 2

Hard Coat B

| Component | Weight (%) | |
|---|---|---|
| CN 980 | 30 | Urethane acrylates ologomer from Sartomer |
| SR 399 | 38 | Multifunctional acrylate monomer from Sartomer |
| SR 285 | 26 | tetrahydrofurfuryl acrylate monoer from Sartomer |
| SR 1129 | 6 | Photoinitiator from Sartomer |

TABLE 3

The transmittance change after abrasion

| Sample | Abrasion | T % @ 750 nm | T % @ 650 nm | T % @ 550 nm | T % @ 450 nm |
|---|---|---|---|---|---|
| Control | Before | 91.2 | 90.8 | 90.1 | 89.6 |
| | After | 81.7 | 80.7 | 79.5 | 78.4 |
| | Change (%) | −10.3 | −11.2 | −11.8 | −12.5 |
| Hard Coat A | Before | 90.9 | 90.5 | 90.0 | 89.1 |
| | After | 85.5 | 84.6 | 83.6 | 82.0 |
| | Change (%) | −5.9 | −6.5 | −7.0 | −7.9 |
| Hard Coat B | Before | 90.9 | 90.7 | 90.3 | 89.6 |
| | After | 82.5 | 81.5 | 90.2 | 78.4 |
| | Change (%) | −9.3 | −10.1 | −11.1 | −12.5 |

Hard coat A showed a better abrasion resistance than the control hard coat but has a higher cost. Hard coat B shows similar (or little better) abrasion resistance than the control hard coat, and has a lower cost.

In our testing, we found that the D2T2 coating has no optical effect on the polycarbonate film.

The document structures described above and related methods for making them can provide a number of advantages. One advantage is increased yield due to the elimination of a lamination process to apply the image receiving layer. Another advantage is reduced cost because the elimination of the lamination process more than offsets costs associated with the coating processes introduced in this approach. Yet another advantage is increased ID document quality and field durability. Finally, this approach maintains compatibility with existing D2T2 printing systems.

Figure 4:
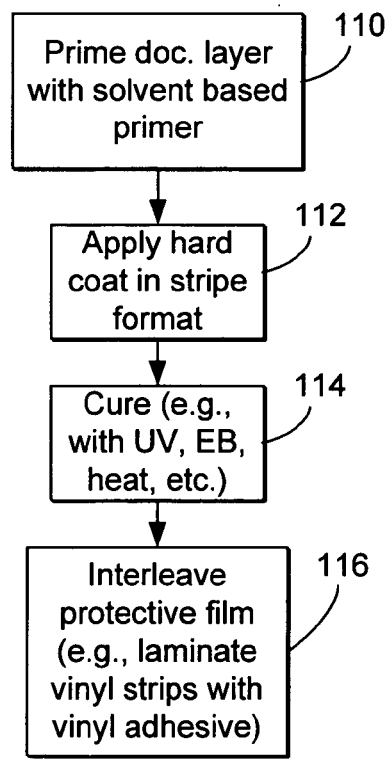
FIG. 4 is a flow diagram illustrating an alternative approach for applying a hard coat in stripe format, interleaved with an image receiving layer, on an ID document structure.

FIG. 4 is a flow diagram illustrating an alternative approach for applying a hard coat in stripe format, interleaved with an image receiving layer. As shown in step 110, this process begins by priming a document layer (e.g., a 13 mil polymer layer such as a polycarbonate or polyester film) with a solvent based primer. Next, the process applies a hard coat in stripe format as above (step 112), and performs a compatible curing process in step 114 (e.g., UV curing for a UV curable hard coat, or alternatively EB or heat curing for compatible hard coatings). The hard coat stripes are designed to coincide with stripes of the optical storage media and form protective optical windows over the optical storage media. Next, the process interleaves an image receiving layer with the stripes of hard coat, and places the image receiving layer onto the primer as shown in step 116. One example is to fine tune the vinyl lamination process described previously to laminate vinyl strips and associated adhesive to the primer layer in between the hard coat stripes. In this case, the vinyl strips act as image receiving layers for D2T2 printing of personalized information.

Alternatively, one could eliminate the primer layer and laminate the vinyl strips directly to the polymer film in the same interleaved fashion. Thus, the priming process is optional.

In the methods of FIGS. 3 and 4, the polymer layer prepared with image receiving and hard coat layers is used to make ID cards. In particular, cards are made by joining a prepared clear polymer laminate layer and one or more webs of other polymer layers with optical storage media in between them. One approach is to laminate the webs together using a curable adhesive. This process forms a composite document structure, where the prepared polymer layer forms the top surface and is ready for printing with variable information on the exposed image receiving layer. Individual cards are die cut from the composite document structure.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. A layered identification document structure comprising:
   a base layer, the base layer incorporating an optical memory device;
   an image receiving layer over the base layer, the image receiving layer covering the base layer except for an optical window formed in the image receiving layer in alignment with the optical memory device; and
   a hard coat layer over the image receiving layer, the hard coat layer covering the image receiving layer in the vicinity of the optical window, whereby the image receiving layer is enabled to receive variable printing other than on the hard coat layer and the optical memory device is protected by the hard coat layer.

2. The document structure of claim 1 wherein the hard coat layer is arranged in a stripe format on the image receiving layer.

3. The document structure of claim 2 wherein the hard coat layer is applied using a gravure coating process.

4. The document structure of claim 1 wherein the hard coat layer is applied using a slot coating process.

5. The document structure of claim 1 wherein the hard coat layer is applied to the image receiving layer in a manner that enables the hard coat layer and the image receiving layer to chemically bond.

6. The document structure of claim 1 wherein the hard coat layer includes a component that bonds directly with the document structure.

7. The document structure of claim 1 wherein the document structure comprises a polycarbonate layer, and the image receiving layer is applied as a coating to the polycarbonate layer.

8. The document structure of claim 7 wherein the hard coat layer includes a component that bonds directly with the polycarbonate layer.

9. The document structure of claim 1 wherein the hard coat layer comprises an acrylate.

10. The document structure of claim 1 wherein the image receiving layer comprises a D2T2 image receiving layer.

11. The document structure of claim 10 wherein the D2T2 receiving layer comprises a D2T2 coating applied to a polycarbonate film in the document structure.

12. The document structure of claim 11 wherein the D2T2 coating comprises a solvent and a resin.

* * * * *